Dec. 18, 1945.          C. D. THRELKELD          2,391,364
                          TWINE HOLDER
                        Filed Jan. 18, 1945
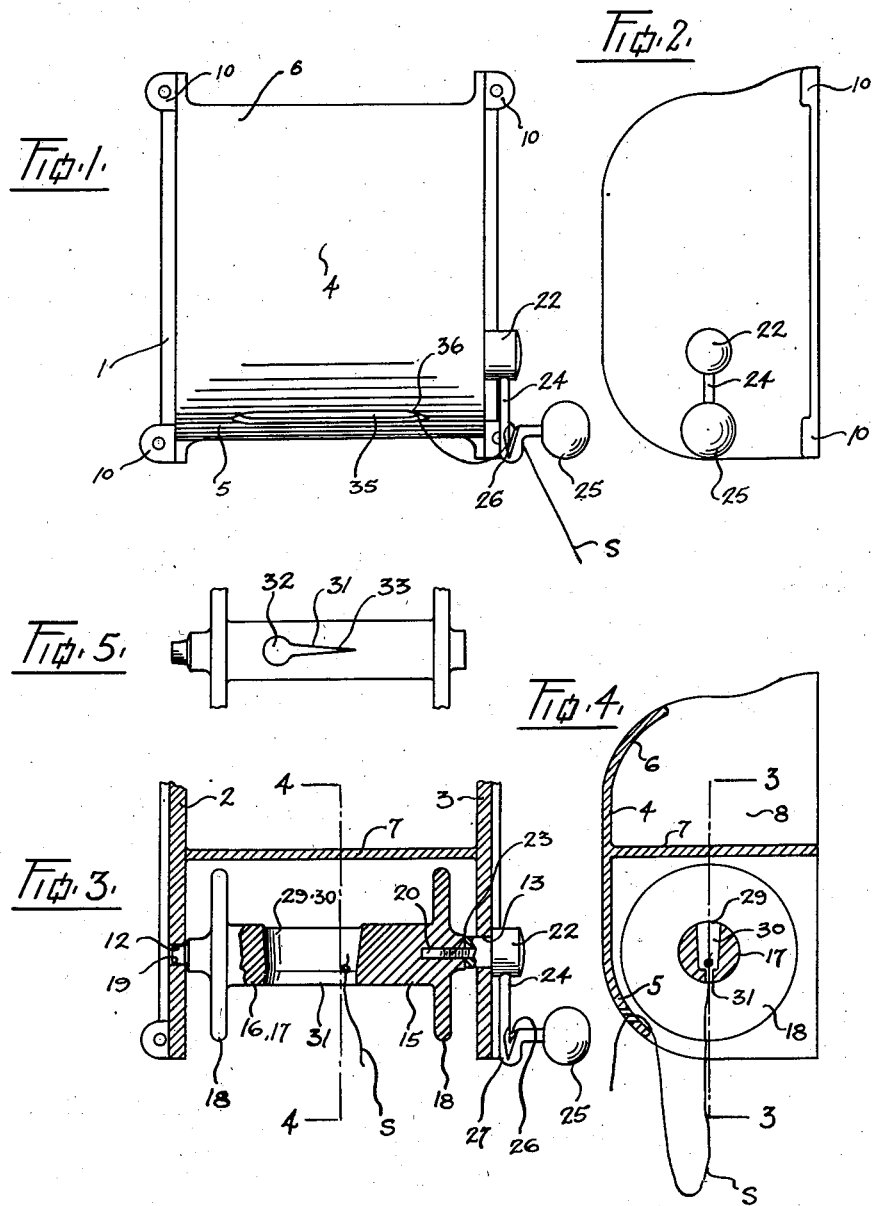
INVENTOR
CLARENCE D. THRELKELD
Ernest E Carver
ATTORNEY.

Patented Dec. 18, 1945

2,391,364

UNITED STATES PATENT OFFICE 2,391,364

TWINE HOLDER

Clarence D. Threlkeld, Bellingham, Wash.

Application January 18, 1945, Serial No. 573,381

3 Claims. (Cl. 242—142)

My invention relates to improvements in twine holders.

The objects of the invention are to provide a convenient wall receptacle in which means for winding, dispensing and cutting twine may be incorporated, so that twine which is reclaimed from parcels and the like may be knotted together and wound upon a reel for later use; to provide a simple means for attaching the twine to the drum, and means for cutting a length of twine from the drum when the desired length is removed therefrom, and also to provide means for holding the twine taut while cutting it.

Referring to the drawing:

Figure 1 is a front elevational view of the invention.

Fig. 2 is a side elevational view of the invention.

Fig. 3 is a sectional view taken on the line 3—3 of Figure 4.

Fig. 4 is a sectional view taken on the line 4—4 of Figure 3.

Fig. 5 is a plan view of the twine reel as viewed from below.

In the drawing like characters of reference indicate corresponding parts in each figure.

The numeral 1 indicates generally a casing having side walls 2 and 3 respectively, a front wall 4 which curves inwardly towards its lower end as at 5 and also upwardly as at 6. A horizontal wall 7 extends from the front wall 4 to the rear of the cabinet to form, with the front and side walls, a receptacle 8 above it. The side walls 2 and 3 are provided with apertured lugs 10 through which screws or brads, not shown, may be used to attach the device to a wall surface.

Openings 12 and 13 are respectively formed in the side walls 2 and 3 to form bearings for a twine reel assembly generally indicated by the numeral 15, which consists of a reel 16 having a core 17, flanges 18, a pivot pin 19 at one end of the core and a recess 20 at the opposite end. A boss 22 is journalled in the bearing 13 and is provided with a stem 23 which is screwed into the recess 20. The boss carries a crank 24 having a knob 25 by which the reel 16 is adapted to be rotated. The crank is preferably formed of steel wire having a close fold 26 at its angle, which is sharpened by appropriate means to form a V-cutter 27.

The core 17 is provided with a slot 29, see Figures 3, 4 and 5, which is on one side an open trough 30 with a keyhole slot 31 in its base, said keyhole slot having its enlarged end of sufficient size as at 32, see Figure 5, to readily admit the knotted end of a piece of twine S and its narrow portion attentuated as at 33 to a dimension such as to lightly grip the twine and prevent the knot from being drawn radially therethrough.

A horizontal slot 35 having an attenuated end 36 is provided in the inbent portion 5 of the front wall 4.

When the device is attached to a vertical surface, the receptacle 8 may be used for matches, rubber bands or any other small articles which are desirably kept in a convenient and accessible position.

To fill the reel 16 with twine, a free end of the twine is passed through the horizontal slot 35 and is gripped by thumb and finger with the knot extending, the free end is then raised through the opening defined between the edge of the portion 5 of the front wall 4 and passed through the enlarged portion 32 of the keyhole slot 31 into the trough 30 and is drawn sidewise to the right as viewed in Figure 3. This movement passes the twine into the attenuated portion 33 of the slot 31 to a point where it is lightly gripped and the knot is prevented from radially outward withdrawal. The crank 24 is then turned, thus rotating the reel and winding the twine thereon.

The outer end of the twine is always left projecting from the slot 35, so that when a length is wanted the end will be hanging in a convenient position. When a suitable length of twine has been withdrawn through the slot 35, it is moved to the right and hooked over the cutter 27 as shown in Figure 1, when a sharp downward pull on said twine will sever it, leaving the new free end hanging from the slot 35 as before.

Since a pull on the twine draws said twine to the right end 36 of the slot 35, it will be gripped to a suitable extent against endwise movement, so that on pulling the twine downwardly to cut it by the cutter 27, the twine will be cleanly cut without being scraped or frayed by the dragging effort on the twine.

The attenuated end 36 of the slot 35 in gripping the twine during the cutting operation also prevents said twine from slipping back through the slot and at the same time leaves a free end of twine of convenient length hanging from said slot immediately accessible for use.

A spring washer or other suitable means may be provided around the pivot pin 19 to prevent free rotation of the reel 16, but as this is of no patentable significance it is not shown.

What I claim as my invention is:

1. A twine holder comprising a casing adapted for attachment to a wall surface and having side walls, a reel journalled between said walls, said reel having a hand crank adjacent one wall, said crank having a cutter adjacent its outer end adapted for cutting a length of twine withdrawn from the reel.

2. A twine holder comprising a casing adapted for attachment to a wall surface and having side walls, and a front wall, said front wall being provided with an elongated opening, a reel journalled between the side walls and having a hand crank exteriorily of the casing, said hand crank having a cutter adjacent its outer end adapted for cutting a length of twine withdrawn from the reel.

3. A twine holder comprising a casing adapted for attachment to a wall surface and having side walls and a front wall, said front wall being provided with an elongated opening having an attentuated end, a reel journalled between the side walls and having a hand crank exteriorily of the casing, said hand crank having a cutter adjacent its outer end adapted for cutting a length of twine withdrawn from the reel.

CLARENCE D. THRELKELD.